(12) United States Patent
Lee et al.

(10) Patent No.: US 10,057,683 B2
(45) Date of Patent: *Aug. 21, 2018

(54) SYSTEM FOR FITTING AUDIO SIGNALS FOR IN-USE EAR

(71) Applicant: ACE Communications Limited

(72) Inventors: Pui Tong Paul Lee, North Point (HK); Ka Kui Cheng, New Territories (HK)

(73) Assignee: ACE Communications Limited, Hong Kong (HK)

(*) Notice: Subject to any disclaimer, the term of this patent is extended or adjusted under 35 U.S.C. 154(b) by 0 days.

This patent is subject to a terminal disclaimer.

(21) Appl. No.: 15/444,261

(22) Filed: Feb. 27, 2017

(65) Prior Publication Data

US 2017/0171661 A1 Jun. 15, 2017

Related U.S. Application Data

(63) Continuation of application No. 14/151,344, filed on Jan. 9, 2014, now Pat. No. 9,584,920.

(60) Provisional application No. 61/750,777, filed on Jan. 9, 2013.

(51) Int. Cl.
| | |
|---|---|
| *H04R 29/00* | (2006.01) |
| *H04R 5/04* | (2006.01) |
| *G06F 3/16* | (2006.01) |
| *H04R 25/00* | (2006.01) |

(52) U.S. Cl.
CPC ............... *H04R 5/04* (2013.01); *G06F 3/165* (2013.01); *H04R 29/001* (2013.01); *H04R 25/70* (2013.01); *H04R 2420/01* (2013.01)

(58) Field of Classification Search
CPC ..... G06F 3/165; H04R 2420/01; H04R 25/70; H04R 29/001; H04R 5/04
USPC ............ 381/60, 71.6, 74, 98, 310, 314, 316; 700/94
See application file for complete search history.

*Primary Examiner* — Vivian Chin
*Assistant Examiner* — Friedrich W Fahnert
(74) *Attorney, Agent, or Firm* — Hinshaw & Culbertson LLP

(57) ABSTRACT

A system and method are provided for automatic fitting of all audio signals according to the ear in which a user is using to receive audio signals from a host device. The host device incorporates an audio signal fitting device, which may comprise an inquirer configured to query the host device for an in-use audio producing transducer; an electronic mechanism configured to identify an ear which a user is using to receive audio signals from a host device, based on the in-use audio producing transducer; and a notifier configured to instruct the host device, based on the identified ear, to output a channel of audio signals to the in-use audio producing transducer. The ear in use may be deduced from inertial data. The instructions may specify a particular channel of audio signals, or enhancement thereof to adjust for characteristics of the identified ear, for example by applying frequency-specific gain adjustments to adjust for frequency response characteristics of the identified ear, and/or to adjust for a detected or typical signal pathway used to transmit a signal to the identified ear.

19 Claims, 6 Drawing Sheets

LEFT EAR SCENARIO

EAR SWITCHING SCENARIO

SYSTEM FOR FITTING AUDIO SIGNALS FOR IN-USE EAR

CROSS REFERENCE TO RELATED APPLICATIONS

This application is a continuation of and claims priority to U.S. non-provisional application Ser. No. 14/151,344 filed Jan. 9, 2014, which issued as U.S. Pat. No. 9,584,920, which claims the benefit of U.S. provisional patent application No. 61/750,777, filed Jan. 9, 2013, the entire disclosures of which are hereby expressly incorporated herein by reference.

FIELD OF INVENTION

The present invention relates to audio devices providing enhanced audio signals. More particularly, it relates to audio devices providing enhanced audio signals to adjust for the inherent hearing characteristics of an individual and/or the hearing characteristics of an individual associated with a particular signal pathway.

BACKGROUND OF THE INVENTION

An audio device, such as a mobile phone or music player, operates in a monaural manner when used in earpiece mode. There is no distinction, to the device, between a user using a left or a right ear in receiving audio signals. This creates a problem because each ear is unique and has its own hearing characteristics. With the audio device failing to acknowledge and treat each ear as a separate entity, the user is being robbed of the chance to listen to customized sound for the specific ear and thus missing the opportunity to enjoy a richer and fuller listening experience.

An obvious solution to the previously mentioned problem is to have an ear (whose inherent hearing characteristics and/or hearing characteristics specific to a particular signal pathway regularly used to transmit sound to that ear are stored in the device) preselected before using the audio device. However, this solution is unnatural and inconvenient. Freedom to select which ear to use to listen to sound from a device should not be restricted by any means. There is no real reason why a user should have to use a particular ear in chatting with her friends, or be restricted from switching ears during a conversation, for example. Nor should an extra step or steps be required in providing customized sound tailored to the selected ear.

A need therefore exists for a device for automatic fitting of audio signals to the ear in which the user has selected to receive the audio signals.

SUMMARY OF THE INVENTION

The invention disclosed herein is designed to enable automatic fitting of all audio signals according to the ear in which a user is using to receive audio signals from a host device. In some embodiments of the present invention, an audio signal fitting device incorporated in the host device comprises an electronic mechanism configured to identify an ear which a user is using to receive audio signals from a host device, based on an in-use audio producing transducer; and a notifier configured to instruct the host device, based on the identified ear, to output a channel of audio signals to the in-use audio producing transducer. The host device may also include an inquirer configured to query a host device for an in-use audio producing transducer. The instructions may specify a particular channel of audio signals, or enhancement thereof to adjust for hearing characteristics of the identified ear, such as by frequency-specific gain adjustments to address frequency-response characteristics of the identified ear, and/or to adjust for a detected or typical signal pathway used to transmit a signal to the identified ear.

In other embodiments of the present invention, the audio signal fitting device further comprises a collector configured to gather at least one dimension of ear characteristics for both ears; and a modifier configured to receive audio signals from the host device, enhance the received audio signals based on the characteristics of the identified ear and specifications from the notifier, and direct the enhanced audio signals to the in-use audio producing transducer.

DETAILED DESCRIPTION OF EMBODIMENTS

Figure 1:
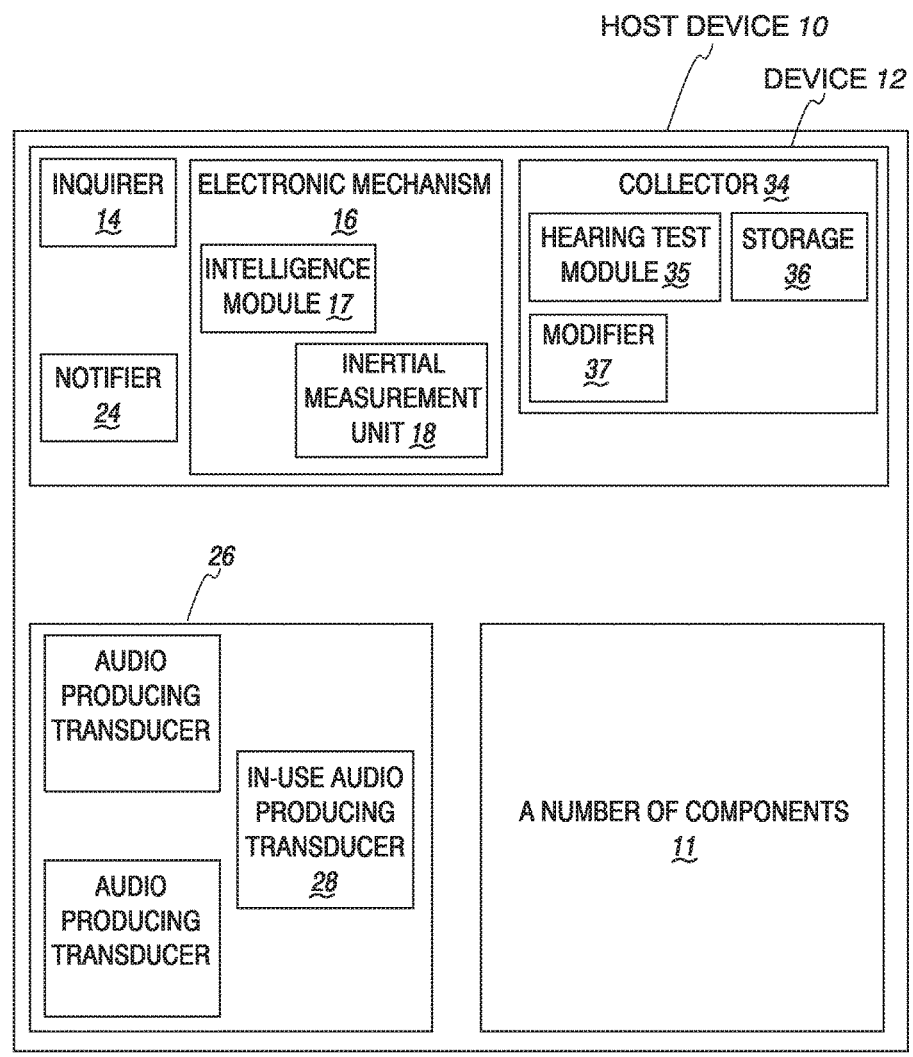
FIG. 1 is a component diagram depicting an embodiment of the present invention.

According to the illustrated embodiment of FIG. 1, an audio signal fitting device 12 comprises an inquirer 14, an electronic mechanism 16, a notifier 24, a collector 34, and a modifier 37.

A host device 10 includes a number of components 11, including audio signal fitting device 12 and at least one audio producing transducer 26, including an in-use audio producing transducer 28. Types of audio producing transducers 26 included vary depending on the intent and purpose of the host device 10. A given audio producing transducer 26 could be one or a pair of earphones, an earpiece, a speakerphone, or a combination of the foregoing.

When the host device 10 receives an instruction or a number of instructions to play one or more audio signals, the inquirer 14 communicates with the host device 10 in gathering information about the audio producing transducers 26. The host device 10 pulls status updates from all of its available audio producing transducers 26 and pushes the retrieved updates to the inquirer 14.

Figure 6:
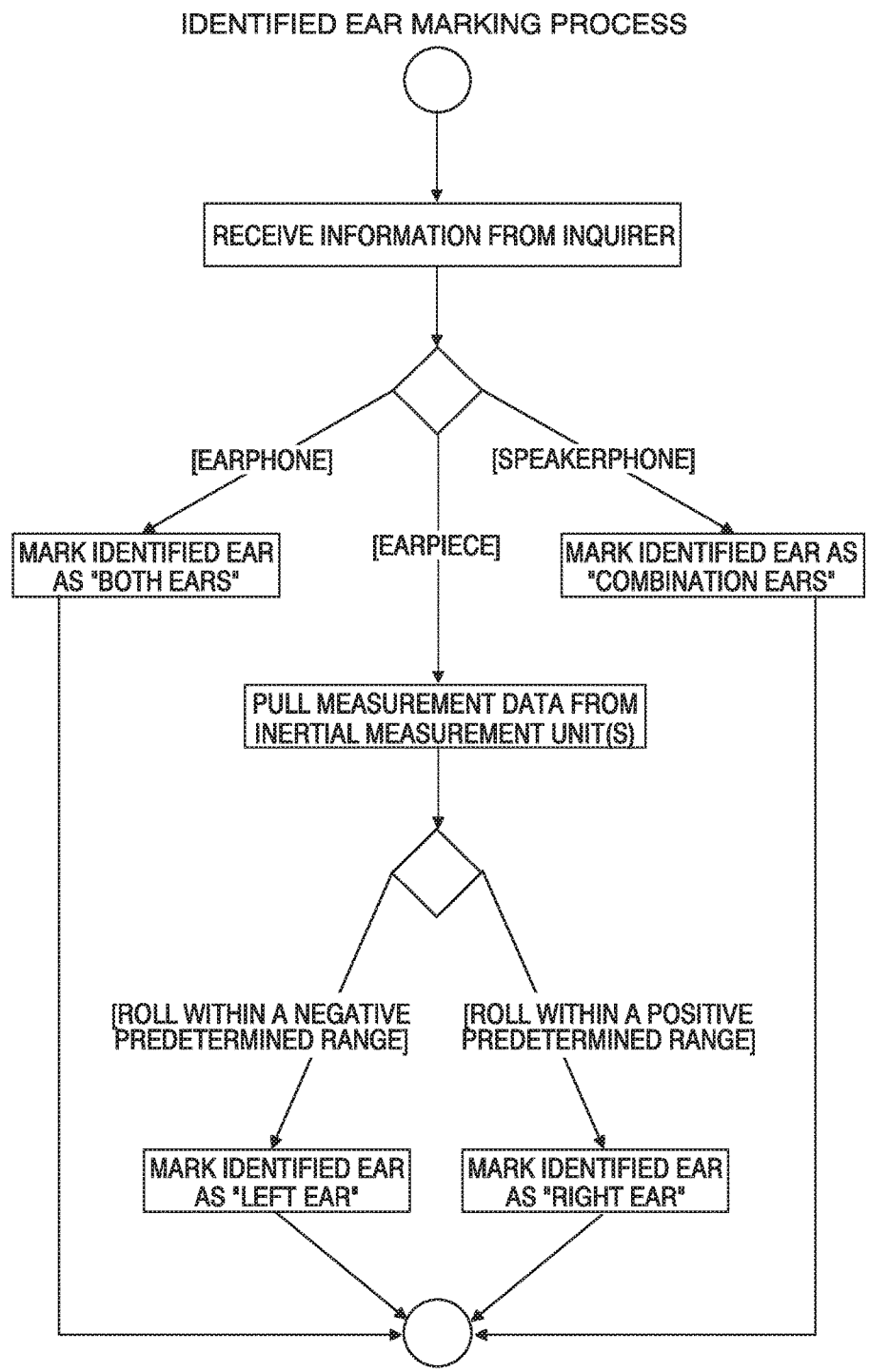
FIG. 6 is an activity diagram depicting a process for marking an identified ear according to an aspect of the invention.

The electronic mechanism 16 comprises at least one inertial measurement unit 18 and an intelligence module 17. Inertial measurement unit 18 measures and reports kinetic data associated with host device 10, such as velocity, orientation, inclination, inertial forces, and/or gravitational forces, for example. Intelligence module 17, based on information from inquirer 14, determines the need in pulling and processing measurement data from at least one inertial measurement unit 18 (FIG. 6):

Case 1: If information from inquirer 14 stated that the in-use audio producing transducer 28 is of type earphone, intelligence module 17 will not pull or process measurement data from any one of the inertial measurement units 18. It will simply mark the identified ear as "both ears."

Case 2: If information from the inquirer 14 stated that the in-use audio producing transducer 28 is of type speakerphone, the intelligence module 17 will not pull or process measurement data from any one of the inertial measurement units 18. It will simply mark the identified ear as "combination ears."

Figure 2:
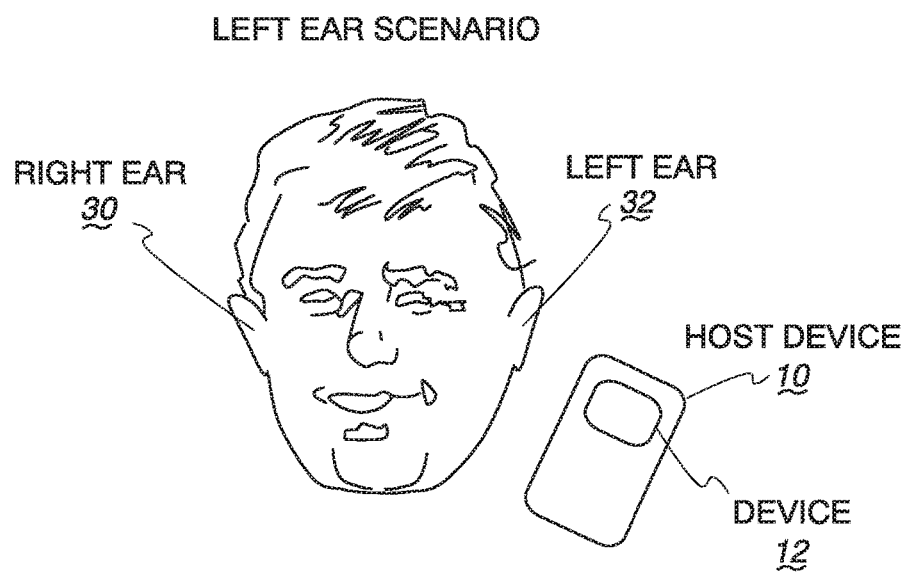
FIG. 2 is a diagram depicting a left ear scenario according to an aspect of the invention.
Figure 3:
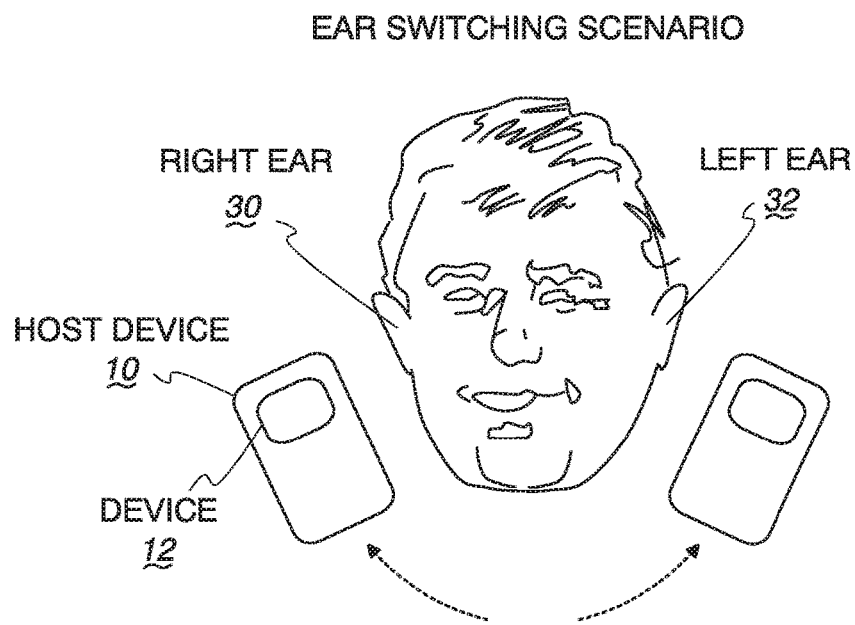
FIG. 3 is a diagram depicting an ear-switching scenario according to an aspect of the invention.
Figure 4:
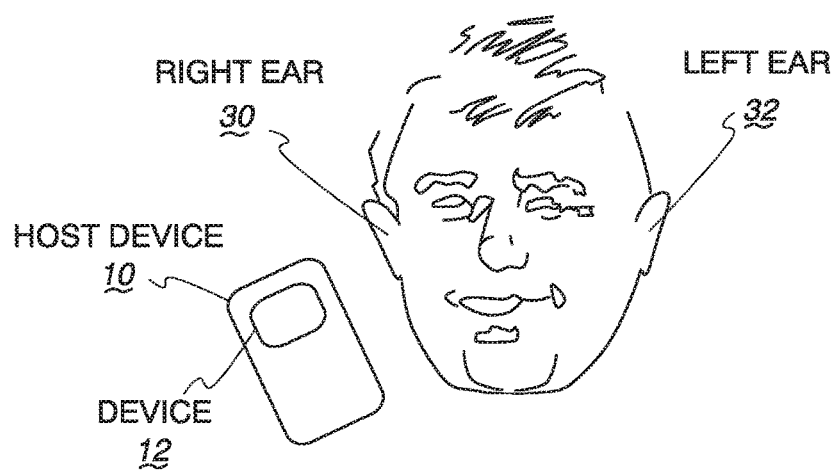
FIG. 4 is a diagram depicting a right ear scenario according to an aspect of the invention.

Case 3: If information from the inquirer 14 stated that the in-use audio producing transducer 28 is of type earpiece, the intelligence module 17 will pull measurement data, such as pitch, yaw, and roll, of the host device 10 (for example, if inertial measurement unit 18 is a single gyroscope) from the inertial measurement unit 18. In this case, as for example when host device 10 is a smartphone as illustrated in FIGS. 2-4, when value of the roll falls within a negative predetermined range (which may, for instance, be characterized by the left edge of the phone being positioned generally below the right edge of the phone, left and right being defined from the perspective of one viewing the phone screen), it is an indication that the host device 10 is positioned on the left side of the user's head for left-ear listening. The intelligence module 17 would then mark the identified ear as "left ear." On the other hand, when value of the roll falls within a positive predetermined range (as characterized, for instance, by the right edge of the phone being positioned generally below the left edge of the phone), it is an indication that the host device 10 is oriented on the right side with respect to the user's head. The intelligence module 17 marks the identified ear as "right ear." To avoid confusion, it is important to note that the depictions of host device 10 in the ear choice scenarios of FIGS. 2-4 are merely convenient illustrations of the host device 10 adjacent to the appropriate ear, while showing a typical example of the appearance of the face of a smartphone that may embody host device 10, and are not intended to show the actual angular orientation of a smartphone when held against the user's ear. Indeed, for example, although the right edge of host device 10 is below the left edge in FIG. 2, it is easily seen that the situation will be reversed (the left edge will instead be facing down) when the user rotates the phone into position against his left ear 32 while keeping the mouthpiece end of the phone towards his mouth. The same observation applies in reverse with respect to the user rotating the phone into position against his right ear 30 from the position illustrated in FIG. 4.

Notably, the rule that "left edge down" means "left ear in use," and "right edge down" means "right ear in use," considered in the aforementioned examples, tends to apply whether the user is standing or in a reclined position, even lying flat on his or her back, owing to the fact that in both positions, a person's mouth is generally positioned forward of both ears. Positioning the mouthpiece forward of the earpiece of a phone that is facing left (toward a user's right ear) will result in the right side of the phone facing down (forward and left may be arbitrarily defined depending on which way one faces, but once those two vector directions are defined, up and down are determined). The fact that an edge of the phone can be identified that will generally always face down when a particular ear is in use is especially useful for rendering possible a static identification of which ear is in use, as an inertial measurement unit 18 that is not subjected to changing movement has no frame of reference to tell left from right or forward from backward (or in terms of angular orientation, an accelerometer is insensitive to changes in yaw angle, i.e., rotation about the vertical or "z" axis, which does not change the vertical position of the accelerometer), but sensing the gravitational field will nonetheless enable it to distinguish up from down.

On the other hand, dynamic position and movement data from inertial measurement unit 18 may be used instead of or in addition to its static orientation to determine which ear is in use. In certain circumstances in which the motion of host device 10 changes, the changes in motion of the device will allow inertial measurement unit 18 to distinguish left from right with a high degree of confidence. For example, if host device 10 begins to move in a particular horizontal direction at a walking pace (felt by inertial measurement unit 18 as a pulse of acceleration in a direction in the plane normal to the gravitational field, not followed by an equal pulse of acceleration in the opposite direction), accompanied by bobbing up and down, this is an indication that the user is walking, most probably facing in the direction of walking movement. (Walking at a constant speed may be concurrently or alternatively detected by a GPS component of the device feeding data to intelligence module 17, even if host device 10 does not include an inertial measurement unit 18 or inertial measurement unit 18 overlooks a walking movement.) If the inertial measurement unit then senses a movement from the right to the left relative to the direction identified as a walking direction, accompanied by a 180 degree rotation about a vertical axis, it is highly probable that the user has switched host device 10 from his right ear to his left ear; likewise, if the lateral movement is from left to right, then it is highly probable that the user has switched host device 10 from his left ear to his right ear.

Another possible dynamic indicator of the ear-in-use position of host device 10 may be contact, and loss thereof, on a user's ear sensed by a touch-sensing component of host device 10, such as a capacitive sensor of a type commonly used in touch screens, a pressure sensor, a temperature sensor, or other suitable touch sensor. For example, if a user manually identifies the ear to be in use to host device 10 and then places host device 10 in contact with that ear, or if the device automatically deduces from any of the indicators discussed herein that a particular ear is currently in use, followed by an extended time period of sustained contact, during which the static angular orientation of host device 10 (with respect to one or more axes) remains constantly within (or usually within) a relatively narrow range, followed by host device 10 sensing that ear contact has been lost and regained, at which time host device 10 is positioned at one or more angles far outside the narrow range, this indicates with a high degree of confidence that the user has switched to the other (contralateral) ear, which was not initially identified. Conversely, if contact is established and never lost after a user manually selects an in-use ear, or if contact is never lost after the device has automatically deduced that an ear is in use, then the device can deduce with near certainty that the initially identified ear remains in use, despite any indication to the contrary deduced from inertial data. The confidence in continuous in-ear use is especially high if any anomalous inertial data is of short duration, tending to indicate a much higher likelihood of the user having briefly assumed a strained posture, such as bending over to pick up an object or propping the phone between his or her ear and shoulder, without removing the phone from contact; than of a loss and regain of contact having somehow gone undetected.

Figure 7:
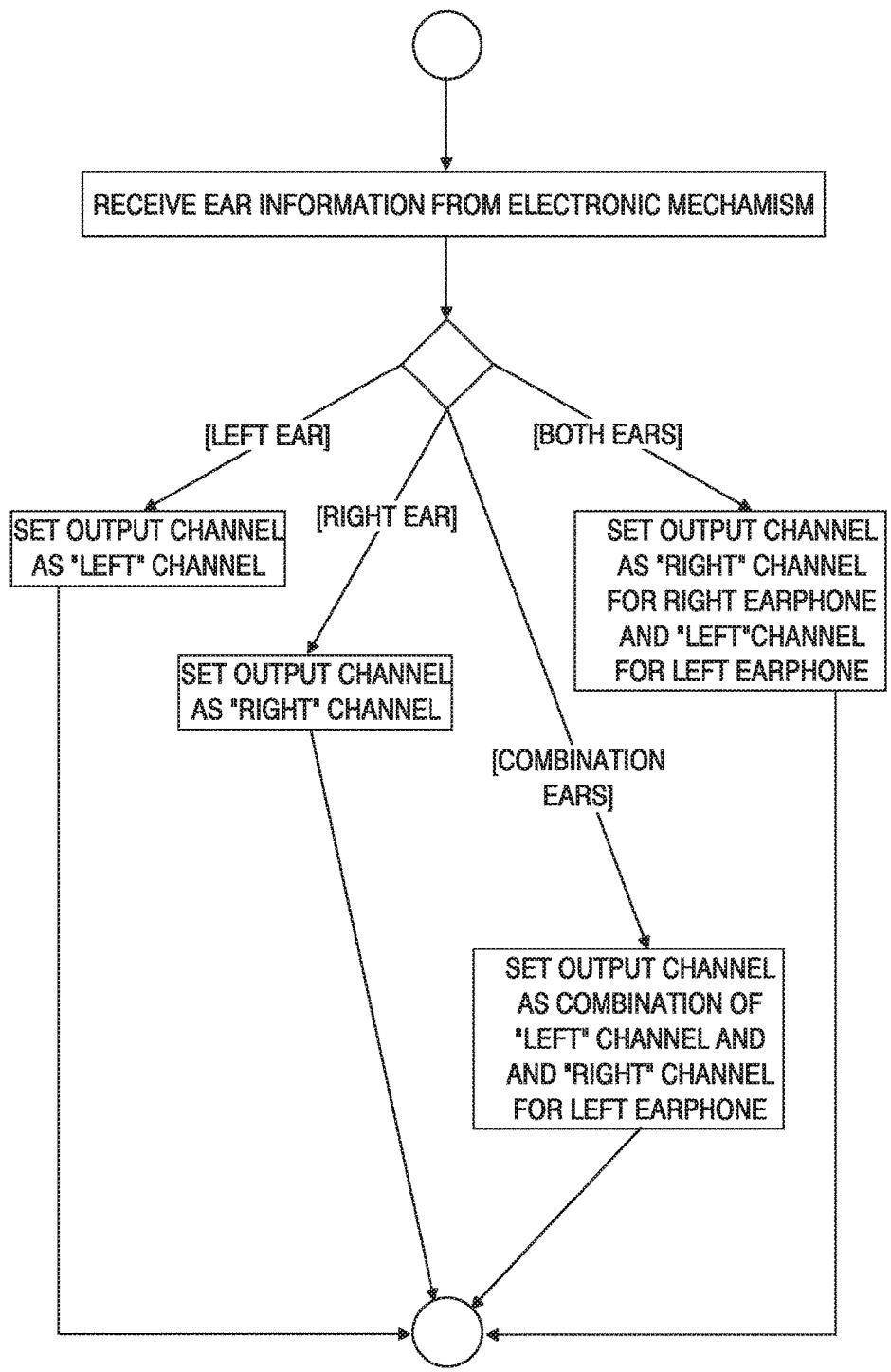
FIG. 7 is an activity diagram depicting an output channel setting process according to an aspect of the invention.

Based on ear information, whether indicated by static orientation or dynamic movements of host device 10 in accordance with the foregoing description, from the electronic mechanism 16, notifier 24 instructs the host device 10 to output a channel of audio signals to the in-use audio producing transducer 28 (FIG. 7). When ear information indicates the identified ear as "left ear", the notifier 24 instructs host device 10 to output a left channel. When ear information indicates the identified ear as "right ear", notifier 24 instructs host device 10 to output a right channel. When ear information indicates the identified ear as "combination ears", notifier 24 instructs host device 10 to output a combination of left and right channels. When ear information indicates the identified ear as "both ears", notifier 24 instructs the host device 10 to output a left channel for the left earphone and a right channel for the right earphone. As described in more detail below, each respective channel may include a particular signal or particular audio enhancements tailored to adjust for hearing characteristics of the specific ear and/or typical, known, or detected characteristics of a signal pathway used to transmit sound to that ear.

Figure 5:
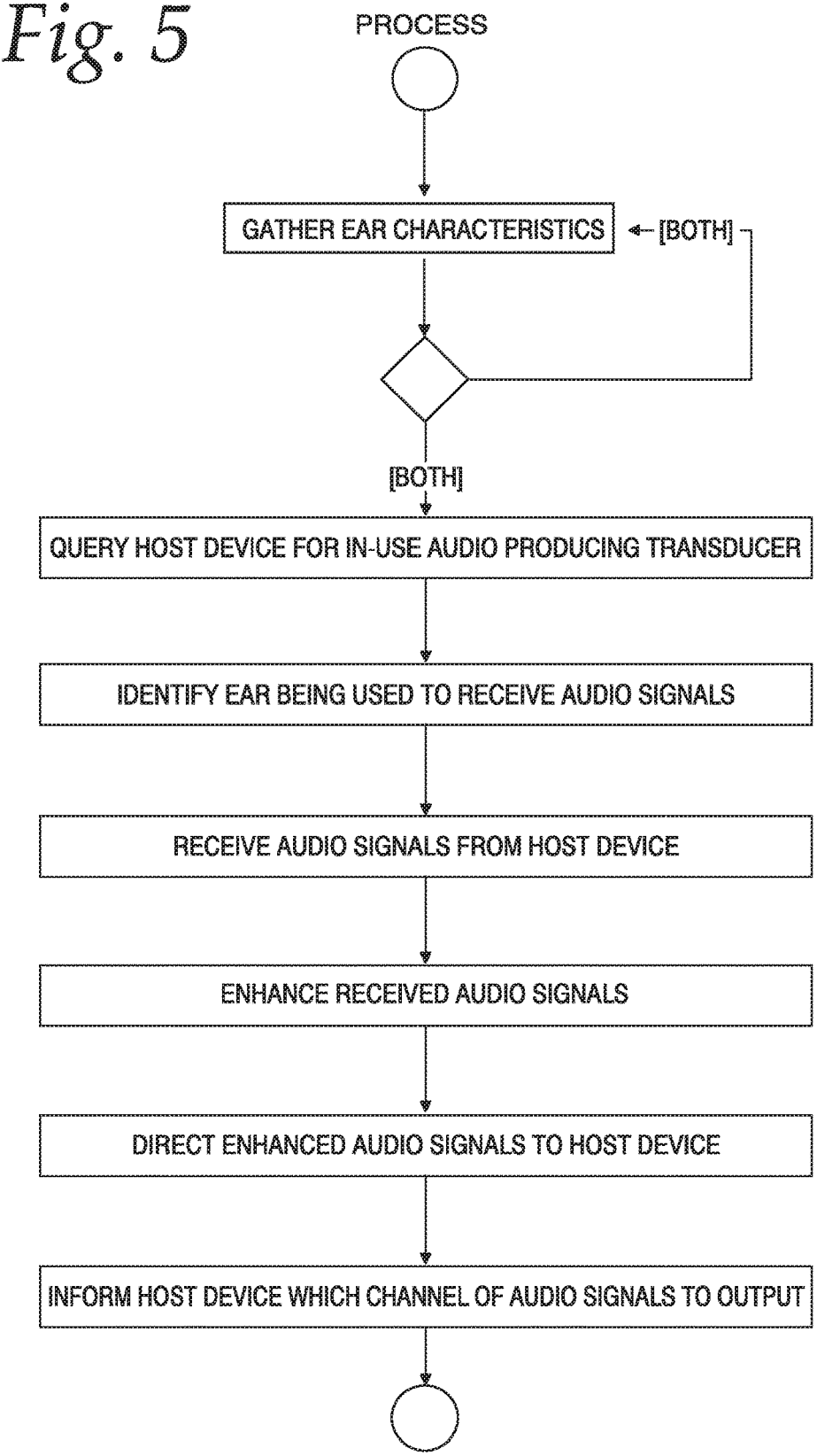
FIG. 5 is an activity diagram depicting a process embodying an aspect of the present invention.

During the usage of host device 10, it is perfectly normal for the user to switch sides or shift the position of host device 10 (FIG. 2, FIG. 3, FIG. 4). Audio signal fitting device 12 detects any changes in real time and updates host device 10 if necessary with the latest channel information. Behind the scenes, intelligence module 17 periodically or continuously pulls, retrieves, monitors, and compares measurement data from at least one of inertial measurement units 18 with previously established measurements, as long as the in-use audio producing transducer 28 is of type earpiece. Also, a "front-of-head" position may be reset every time the user interacts with a touch screen of host device 10, tending to strongly indicate that the touch screen is facing toward the user's face. The front-of-head position may be similarly detected when the user interacts with tactile buttons of host device 10, albeit with a lower degree of confidence, owing to the fact that a user may be able to identify and interact with buttons solely by feel. Thus, absent other higher-confidence indications that host device 10 is not in fact facing the user's face, tactile button interaction may also trigger a reset of the front-of-head position. Inquirer 14 updates the intelligence module 17 in real time whenever there are changes in the in-use audio producing transducer 28. If the differences in measurement data fall outside of a predetermined range (as in the above example of ear contact lost and regained, accompanied by a significantly changed angular orientation), it is likely an indication that host device 10 has been switched from one side to another. Intelligence module 17 then informs notifier 24 of the new arrangement. Host device 10, upon receiving the new arrangement from the notifier 24, would instruct in-use audio producing transducer 28 in outputting the appropriate channel of audio signals (FIG. 5).

Before audio signals can be customized for a specific ear, characteristics of each ear need to be gathered. Collector 34 comprises a hearing test module 35 and a storage module 36. The hearing test module 35 seeks to find out the user's minimum audible intensity/decibel level for at least one of the audiometric frequencies before saving the result or results to the storage module 36. Hearing test module 35 may be of a type that generates an auditory profile which isolates or nearly isolates inherent hearing characteristics (e.g., frequency response) of the user's ear from other factors, or a type that generates a "shaped" auditory profile which captures the net response of an entire signal pathway from an input electronic signal to the user's ear, including, for example, environmental noise, transducer characteristics, and/or transducer position and orientation with respect to the user's ear, the signal pathway advantageously corresponding to an actual signal pathway that the user regularly uses to transmit sound to her ear. In the context of a method and system for self-managed sound enhancement, these two types of hearing tests are described in more detail in U.S. patent application Ser. No. 13/184,776 and provisional application No. 61/750,779, the entireties of each of which are hereby incorporated by reference.

The storage module 36 could also be used to hold characteristics of ears from other sources, e.g., an audiogram from an audiologist and/or other hearing characteristics stored in the cloud, which may alternatively or additionally be used to determine signal enhancement. If there is more than one set of characteristics in the storage module 36, they may be sorted in a particular order or according to predefined rules. The modifier 37 receives audio signals from the host device 10, enhances the received audio signals to adjust for the latest characteristics of the identified ear and specifications from storage module 36, and electronic mechanism 16, before directing the enhanced audio signals to the in-use audio producing transducer 28 (FIG. 5). In this manner, the user can enjoy customized sound for the ear which he or she is using to receive audio signals from the host device 10.

The invention has been explained with reference to specific embodiments. Other embodiments will be evident to those of ordinary skill in the art. Therefore, it is not intended that the invention be limited, except as indicated by the appended claims.

What is claimed is:

1. A system for fitting audio signals for an in-use ear comprising:
   a host device;
   an in-use audio producing transducer associated with the host device; and
   an audio signal fitting device;
   the audio signal fitting device including a storage module configured to store hearing characteristics of a right ear and hearing characteristics of a left ear of a user;
   the audio signal fitting device including an electronic mechanism;
   when the in-use audio producing transducer is of an earpiece type, the electronic mechanism being configured to identify an in-use ear which a user is using to listen to audio produced by the in-use audio producing transducer, as either the right ear or the left ear, based on the position and/or movements of the in-use audio producing transducer; and
   the audio signal fitting device including a notifier;
   the notifier being configured to instruct the host device to output an output channel of enhanced audio signals to the in-use audio producing transducer including frequency-specific gain adjustments to adjust for hearing characteristics stored by the storage module for the identified ear.

2. The system of claim 1, further comprising
   when the in-use audio producing transducer is of an earphone type, the notifier being configured to instruct the host device to output a left output channel of enhanced audio signals to a left earphone of the in-use audio producing transducer to adjust for hearing characteristics stored by the storage module for the user's left ear and to output a right output channel of enhanced audio signals to a right earphone of the in-use audio producing transducer to adjust for hearing characteristics stored by the storage module for the user's right ear.

3. The system of claim 1, further comprising
   when the in-use audio producing transducer is of a speakerphone type, the notifier being configured to instruct the host device to output an output channel of enhanced audio signals to the in-use audio producing transducer to adjust for a combination of hearing characteristics stored by the storage module for both of the user's ears.

4. The system of claim 1, further comprising:

the audio signal fitting device including a collector configured to gather at least one dimension of hearing characteristics of the right ear and the left ear; and the audio signal fitting device including a modifier configured to receive input audio signals from the host device and to enhance the input audio signals based on the characteristics of the identified ear and specifications from the notifier to produce said output channel of enhanced audio signals.

5. The system of claim 4, wherein the collector comprises a hearing test module and said storage module, the hearing test module configured to determine a minimum audible intensity level of the user for at least one audiometric frequency and to save said minimum audible intensity level to the storage module.

6. The system of claim 4, wherein the collector is configured to receive external hearing test results from an external source, said stored hearing characteristics of the identified ear being determined by the external hearing test results.

7. The system of claim 1, wherein the electronic mechanism comprises an intelligence module and at least one inertial measurement unit.

8. The system of claim 7, wherein the intelligence module is configured to assess the orientation of the host device relative to the user's head, based on measurement data from the at least one inertial measurement unit, in identifying the ear which the user is using to receive audio signals from the host device.

9. The system of claim 8, wherein the intelligence module is further configured to track and detect any changes in previously established measurements and re-assess the orientation of the host device relative to the user's head in re-identifying the ear which the user is using to receive audio signals from the host device.

10. The system of claim 9, wherein the electronic mechanism is configured to perform said tracking, detection, and assessment automatically and in real time.

11. The system of claim 9, wherein the electronic mechanism is configured to perform said tracking, detection, and assessment at variable time intervals.

12. The system of claim 7, wherein the inertial measurement unit is a gyroscope.

13. The system of claim 7, wherein the inertial measurement unit is an accelerometer.

14. The system of claim 7, wherein the inertial measurement unit is an accelerometer and a gyroscope.

15. An audio signal fitting method using a host device connected to an in-use audio producing transducer, comprising:

when the in-use audio producing transducer is of an earpiece type, identifying an ear which a user is using to listen to audio produced by the transducer;

receiving input audio signals from the host device;

adjusting the input audio signals for stored hearing characteristics of the identified ear to produce an output channel of enhanced audio signals; and instructing the host device to output the output channel of enhanced audio signals to the in-use audio producing transducer.

16. The method of claim 15, further comprising:

gathering at least one dimension of ear characteristics for both ears; and further adjusting the input audio signals for characteristics of a signal pathway to the identified ear to produce said output channel of enhanced audio signals.

17. The method of claim 16, wherein characteristics of the signal pathway are derived from a self-administered hearing test that measures left- and right-ear hearing characteristics of the individual for the signal pathway, the signal pathway comprising at least one of:

a transducer with different frequency response characteristics than those of a transducer meeting hearing test standards; and detectable environmental sounds.

18. The method of claim 15, further comprising when the in-use audio producing transducer is of an earphone type, causing the host device to output a left output channel of enhanced audio signals to a left earphone of the in-use audio producing transducer to adjust for hearing characteristics stored by the storage module for the user's left ear and to output a right output channel of enhanced audio signals to a right earphone of the in-use audio producing transducer to adjust for hearing characteristics stored by the storage module for the user's right ear.

19. The system of claim 15, further comprising when the in-use audio producing transducer is of a speakerphone type, causing the host device to output an output channel of enhanced audio signals to the in-use audio producing transducer to adjust for a combination of hearing characteristics stored by the storage module for both of the user's ears.

* * * * *